United States Patent [19]

Weisert

[11] Patent Number: 4,678,115
[45] Date of Patent: Jul. 7, 1987

[54] METHOD FOR MAKING LAYERED FOIL STRUCTURE

[75] Inventor: Edward D. Weisert, San Carlos, Calif.

[73] Assignee: Ontario Technologies Corporation, Menlo Park, Calif.

[21] Appl. No.: 723,629

[22] Filed: Apr. 15, 1985

[51] Int. Cl.⁴ .............................................. B23K 31/02
[52] U.S. Cl. ................................. 228/183; 228/173.6; 228/265; 156/210; 493/463; 29/455 LM; 29/157.3 D
[58] Field of Search ..................... 228/183, 173.6, 185, 228/265, 173.2; 493/463, 374, 447; 156/205–208, 210, 469–474; 29/157.3 D, 157.3 R, 157.3 V, 455 LM

[56] References Cited

U.S. PATENT DOCUMENTS

| | | | |
|---|---|---|---|
| 2,047,584 | 7/1936 | Harrap | 156/210 |
| 2,406,815 | 9/1946 | Elfving | 156/210 X |
| 2,454,719 | 11/1948 | Scogland | . |
| 2,633,442 | 3/1953 | Caldwell | . |
| 3,345,735 | 10/1967 | Nicholls | 29/470.9 |
| 3,666,590 | 5/1972 | Susuki et al. | 156/210 |
| 3,955,019 | 5/1976 | Keith | 428/131 |
| 4,025,996 | 5/1977 | Saveker | 428/594 |
| 4,376,669 | 3/1983 | Math | 156/210 X |
| 4,394,422 | 7/1983 | Van Thyne et al. | 428/594 |

FOREIGN PATENT DOCUMENTS 346157  6/1960  Switzerland ........................ 493/463

Primary Examiner—Nicholas P. Godici
Assistant Examiner—Carmine Cuda
Attorney, Agent, or Firm—Fliesler, Dubb, Meyer & Lovejoy

[57] ABSTRACT

A method is set forth for forming a unitary structure having a plurality of deformable foils having first and second sides stacked one upon another with the first sides facing in one direction and the second sides in an opposite direction, each of the foils having an undulating cross-section, adjacent of the foils having their undulations orthogonal to one another and every other one of the foils having parallel orientations. The method comprises positioning a first plurality of parallel rods against the first side of a respective one of the foils and positioning a second plurality of parallel rods against the second side of the same foil with the rods of the second plurality of rods between and parallel to the rods of the first plurality of rods. Thereafter the aforementioned steps are repeated with each next adjacent foil having the rods defining the undulating cross-section thereof at a non-zero angle to the rods of the next adjacent foil. The foils are then diffusion bonded to each other at their points of contact to form a unitary structure and the rods are removed from the unitary structure. An apparatus including combs which bear such rods and a jig having a plurality of generally parallel pins positioned to form a generally rectangular cavity therebetween sized to receive the foils therein in stacked arrangement generally orthogonal to the pins with the pins being spaced to receive the rods of the combs therebetween and extending between the foils also forms a part of the invention.

3 Claims, 8 Drawing Figures

METHOD FOR MAKING LAYERED FOIL STRUCTURE

DESCRIPTION

1. Technical Field

The present invention relates to a method and apparatus for making a layered foil structure with the foils having undulating cross-sections and with adjacent foils having their undulating crosssections normal to one another. The resulting structure is quite lightweight and suitable for heat management in environments where such a lightweight structure is desired.

12. Background Art

Corrugated structures, generally, are known to the prior art. Multi-layer structures of this nature are not so well known. Such structure are, however, somewhat known as is disclosed, for example, in U.S. Pat. No. 3,345,735 issued Oct. 10, 1967 to A. H. Nicholls. The Nicholls patent discloses the formation of a honeycomb core through application of heat and pressure to a series of sheets or foils. Adjacent sheets or foils are secured to one another along lines of contact and each foil has a parallel undulating cross-section to each other foil.

It has not been possible using prior art methods and apparatus to prepare a foil structure wherein adjacent foils have undulating cross-sections with the undulations of each foil orthogonal to the undulations of the touching foil. Yet, such a structure, if constructed, would have an advantageous response to a normally imposed heat flux.

The present invention is directed to overcoming one or more of the problems as set forth above.

DISCLOSURE OF INVENTION

In accordance with an embodiment of the present invention a method is set forth of forming a unitary structure having a plurality of deformable foils having first and second sides stacked one upon another with the first sides facing in one direction and the second sides facing in an opposite direction, each of the foils having an undulating cross-section, adjacent of the foils having their undulations at a non-zero angle to one another. The method comprises positioning a first plurality of parallel rods against the first side of a respective one of the foils and positioning a second plurality of parallel rods against the second side of the respective one of the foils with the rods of the second plurality of rods between and parallel to the rods of the first plurality of rods. Thereafter, the just mentioned positioning steps are repeated with each next adjacent foil with the rods positioned against said each next adjacent foil at a non-zero angle to the rods positioned against each preceeding one of the foils until a desired number of foils and rods have been positioned, the rods serving to establish the undulating cross-sections of the foils. Each of the foils is bonded to each next adjacent of the foils at their points of contact to form the unitary structure. The pluralities of rods are removed longitudinally from the unitary structure.

In accordance with another embodiment of the present invention an apparatus is set forth for forming a unitary structure having a plurality of deformable metal foils stacked one upon another, each of the foils having an undulating cross-section, adjacent of the foils having their undulating cross-sections orthogonal to one another, and every other one of the foils having parallel orientations. The apparatus comprises a plurality of combs, each having a plurality of parallel rods having first and second end portions, the first end portions being connected together by a spine. The apparatus further comprises a jig having a plurality of generally parallel pins positioned to form a generally rectangular cavity therebetween sized to receive the foils therein in stacked arrangement generally orthogonal to the pins, the pins being spaced to receive the rods of the combs therebetween and extending between the foils.

Utilizing the method or apparatus of the present invention it is possible to form the required unitary structure with the foils connected together only at points of contact. Furthermore, this can be accomplished, in accordance with the preferred embodiment of the invention by diffusion bonding techniques to form extremely strong bonds in a relatively inexpensive manner. Furthermore, the rods can be removed for reuse.

BRIEF DESCRIPTION OF DRAWINGS

The invention will be better understood by reference to the figures of the drawings wherein like numbers denote like parts throughout and wherein.

BEST MODE FOR CARRYING OUT THE INVENTION

Figure 1:
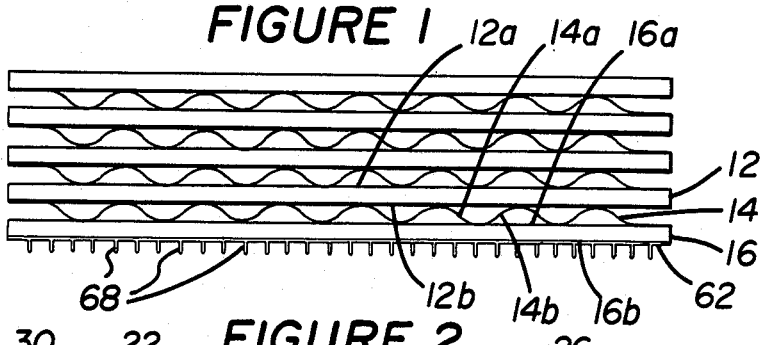
FIG. 1 illustrates, in end view, a unitary structure formed in accordance with the present invention.

The present invention provides a method of forming a unitary structure 10 as seen in FIG. 1 which includes a plurality of deformable foils 12, 14 and 16 having respective first sides 12a, 14a and 16a and respective second sides 12b, 14b, 16b. The first sides 12a, 14a, 16a face in one direction and the second sides 12b, 14b, 16b face in an opposite direction. Each of the foils has an undulating cross-section, for example, a sinusoidal cross-section. In the view seen in FIG. 1 the undulating cross-section of the foil 14 is apparent. The foils 12 and 16 also have undulating cross-sections with their undulations at a non-zero angle to and preferably orthogonal to the undulations of the foil 14 and parallel to the undulations of each other foil (12 and 16). That is, the undulations of the foil 12 are parallel to the undulations of the foil 16.

Figure 2:
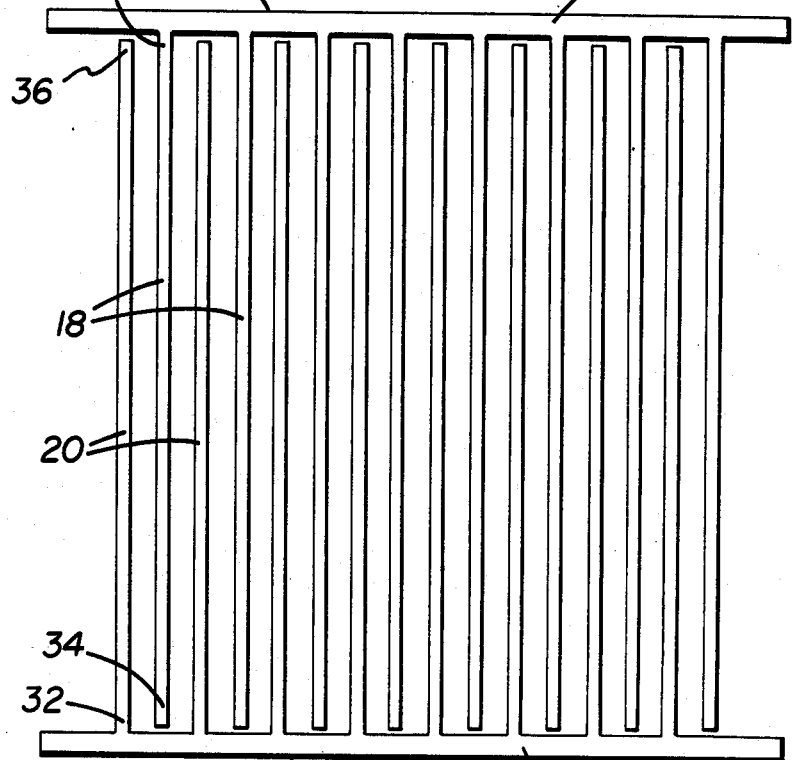
FIG. 2 illustrates, in top view, a pair of combs useful in practicing the method of the present invention and which form a part of an apparatus in accordance with the present invention.
Figure 3:
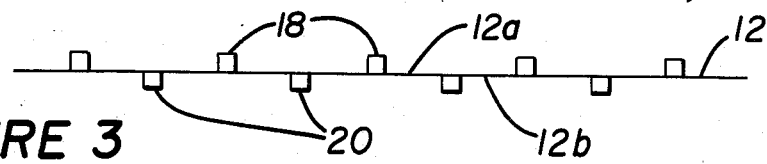
FIG. 3 illustrates a single foil having rods positioned atop and below it.
Figure 4:
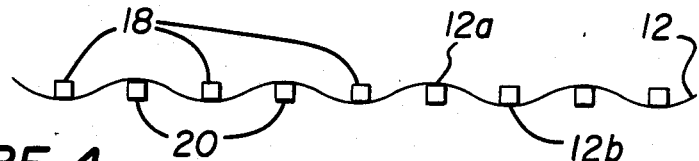
FIG. 4 illustrates the structure as in FIG. 3 but wherein the rods have deformed the foil so that it has an undulating cross-section.

FIG. 3 shows a single foil 12 with a first plurality of parallel rods 18 against the first side 12a of one of the foils 12 and a second plurality of parallel rods 20 against the second side 12b of the foils 12 with the rods of the second plurality of rods 20 parallel to the rods of the first plurality of rods 18. On compression of the rods 18 towards the rods 20 so that they become substantially coplanar, undulations are produced in the foil 12 as illustrated in FIG. 4. In practice there is another foil beneath the foil 12, namely the foil 14, and the rods which create the undulating cross-section in the foil 14 are generally perpendicular to the rods 18 and 20. This produces an undulating cross-section in the foil 14 with the undulations generally orthogonal to the undulations in the foil 12. As illustrated in FIG. 2 the rods 18 and 20 may be parts of respective combs 22 and 24 formed by respective bridges 26 and 28 connecting together respective first ends 30 and 32 of the rods 18 and 20. As will be noted by reference to FIG. 2 the respective second ends 34 and 36 of the rods 18 and 20 extend respectively towards the bridges 28 and 26 of the other comb 24 and 22. This structure is particularly advantageous in that the combs 22 and 24 may simply be pulled out from inside of the unitary structure 10.

Figure 5:
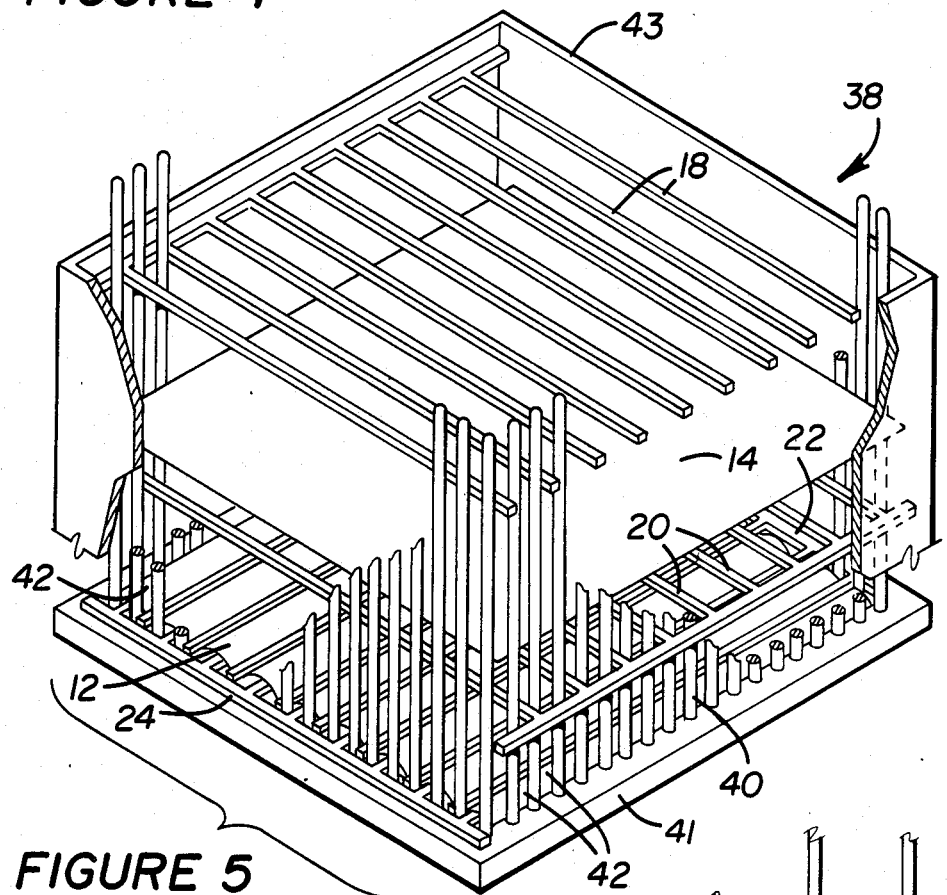
FIG. 5 illustrates, in perspective, a jig in accordance with the present invention and the use of combs therewith for making an orthogonally oriented structure.

FIG. 5 illustrates a jig 38 useful with the combs 22 and 24. The jig 38 has a plurality of generally parallel pins 40 which are anchored in a pin plate 41 and are positioned to form a generally rectangular cavity 42 therebetween which is sized to receive the foils 12, 14, 16, etc., therein in stacked arrangement generally orthogonal to the pins 40. The pins 40 are spaced to receive the rods 18 and 20 of the combs 22 and 24 therebetween and extending between the foils 12, 14, 16, etc.

In practice, the jig 38 is utilized to stack a plurality of the foils 12 with the combs 22 and 24 positioned so that the rods 18 and 20 are generally as shown in FIG. 3. The jig 38 will generally be within a box 43 whereby the combs 22 and 24, etc., are maintained in proper alignment. The box 43 can also serve as means for transporting the completed assembly to a bonding unit (not shown). Generally, because of the weight of the structure as it is formed, the foil and tine arrangement will be somewhere between that shown in FIG. 3 and that shown in FIG. 4. That is, the undulating cross-section will generally be at least partially established in the foil 12. The foil 14 is then placed atop the foil 12 with the combs 22 and 24 orthogonal to the combs 22 and 24 used to create the desired undulating cross-section in the foil 12. This procedure is continued until a desired number of foils have been stacked, one upon another. The resulting construction has aligned rod cross-over points, i.e., points where adjacent pluralities of rods 18,20 cross over each other with foils 12,14,16, etc., sandwiched therebetween. The aligned cross-over points define columnar load intersections through which bonding pressure may be applied.

The foils 12,14,16, etc., can be of any thickness which will allow the ready formation of the desired undulations. Generally, the thickness of the foils 12,14,16, etc., may range from less than 0.001 inch on upward.

In accordance with a preferred embodiment of the present invention each of the foils 12, 14, 16, etc., is diffusion bonded to each next adjacent of the foils at their points of contact to form the desired unitary structure 10. Bonding forces are transmitted through a plate (not shown) contacting the uppermost of the comb sets 22,24 and are reacted by the pin plate 41 below the lowermost of the comb sets 22,24. The comb tine intersections load up as columns in which the foils 12,14,16, etc., are bonded. Preferably, the bonding is carried out in vacuum. Next, each of the pluralities of rods 18,20 is removed longitudinally from the unitary structure 10.

Bonding methods other than diffusion bonding may also be used although the strengths of the resulting bonds will be less than that attainable via diffusion bonding. As one example, the foils 12,14,16, etc., or at least the points of contact of such foils 12,14,16, etc., may be coated with a brazing material such as copper, e.g., by plating the brazing material thereon, and heat and pressure may be applied to form a braze joint. As another example, an adhesive material may be applied, at least at the points of contact. As yet another example, the points of contact may be resistance welded together.

Figure 6:
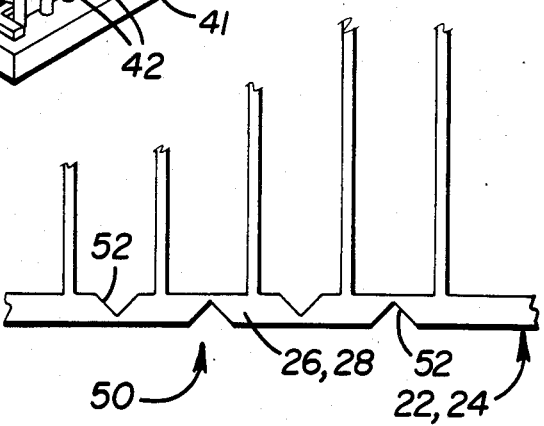
FIG. 6 illustrates a detail in the construction of the combs in accordance with an embodiment of the present invention.

FIG. 6 illustrates a version of bending alleviating means 50 for alleviating bending of the bridges 26 and 28 of the combs 22 and 24. The illustrated bending alleviating means 50 comprises a plurality of notches or slots 52 in the bridges 26 and 28, at least one of the slots or notches 52 being located intermediate each adjacent pair of the rods 18 and 20. In this manner, during diffusion bonding stresses in the combs 22 and 24 which are induced by temperature differences are relieved. Generally, the cross-section of the respective bridges 26 and 28 at the notches or slots 52 will be less than the cross-sections of the rods 18 and 20. In this manner, the rods 18 and 20 are assured to remain generally parallel during the diffusion bonding process.

Figure 8:
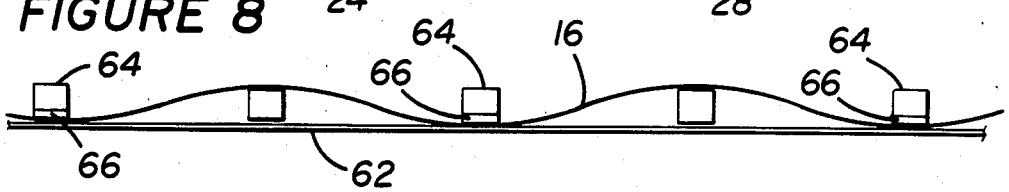
FIG. 8 illustrates use of the special comb of FIG. 7.
Figure 7:
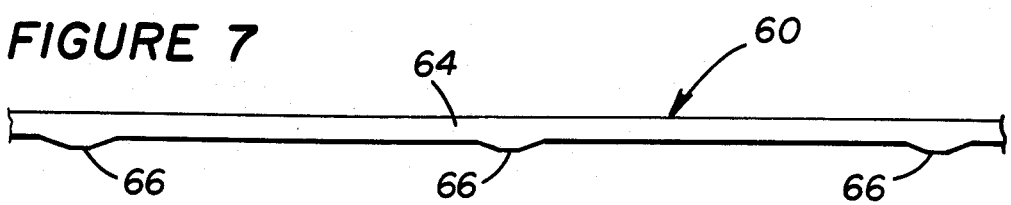
FIG. 7 illustrates a special comb utilized with an embodiment of the present invention.

FIG. 7 illustrates a special comb 60 adapted for bonding a non-undulating bottom foil 62 (see FIG. 1) to the next adjacent foil 16 only at points of contact rather than along lines of contact. The rods 64 of the special comb 60 have a plurality of nubs 66 which extend into contact with the foil 16 (see FIG. 8) and define a limited number of points of contact of the foil 16 (below the nubs) with the bottom foil 62. The nubs 66 are located in alignment with the cross-over points between adjacent pairs of orthogonally aligned combs 22,24 whereby compression forces applied to bond the undulating foils 12,14,16, to one another also serve to bond the foil 16 to the bottom foil 62 only at the points of contact. The bottom foil 62 may have a plurality of parallel ribs 68 extending therefrom to provide rigidity. The ribs 68 can be formed, if desired, by making appropriate folds in the bottom foil 62.

It should be noted that while the diffusion bonding embodiment of the invention is operable with any metal which will undergo diffusion bonding it is particularly concerned with working with certain particular "reactive" metals which are capable of diffusion bonding. Diffusion bonding refers to the solid-state, metallurgical joining of clean surfaces of similar or dissimilar metals by applying heat and pressure for a time duration so as to affect intimate surface contact and cause co-mingling of atoms at the joined innerface. A number of metals can be diffusion bonded, including the aforementioned "reactive" metals such as alloys of titanium and zirconium.

In order to produce the desired diffusion bonding of the foils to one another without the rods 18 and 20 bonding to the foils, the rods 18 and 20 must have a surface that will not form diffusion bonds to the foils 12,14,16, etc. This can be accomplished by treating the rods with a stop off or parting material, such as yttria, boron nitride, graphite or alumina, to prevent bonding of the treated surfaces of the rods 18 and 20 to the foils 12, 14, 16, etc., during diffusion bonding.

To attain the necessary pressure between the foils at their points of contact the foils can be compressed together as by utilizing a hydraulic or pneumatic press, by utilizing weights, by utilizing a gas pressurized diaphragm, by utilizing pressurized bellow, by utilizing mechanical or electromechanical force generators, or by any other convenient method. To attain the diffusion bonding conditions the entire jig 38 with the foils 12, 14, 16, etc., therein will be heated to a temperature appropriate for the material to be bonded. For example, titanium would typically be bonded above 800° C. Generally, the bonding pressure will be from about 100 to about 600 psi and will be maintained for a time sufficient for formation of the desired bonds.

INDUSTRIAL APPLICABILITY

A unitary structure 10 produced utilizing the method and/or apparatus as set forth above can be used for various heat management purposes. Such a structure with proper manifolding can have fluids flowed therethrough generally parallel to the foils thereof with relatively low obstruction.

I claim:

1. A method of forming an expanded unitary structure having a plurality of deformed foils each having an undulating cross-section, said foils having first and second sides and being stacked one upon another with said first sides facing in one direction and said second sides facing in an opposing direction, adjacent of said foils having their undulations at a non-zero angle to one another, comprising:
   (A) positioning a first plurality of parallel rods against said first side of a respective one of said foils;
   (b) positioning a second plurality of parallel rods against said second side of said respective one of said foils with the rods of said second plurality of rods between and parallel to the rods of said first plurality of rods;
   (C) thereafter repeating steps (A) and (B) with each next adjacent foil with the rods positioned aginst said each next adjacent foil at a non-zero angle to the rods positioned against each preceeding one of said foils with the rods of every other of each of said first pluralities of rods parallel to one another and with the rods of every other of each of said second pluralities of rods parallel to one another, to define a plurality of aligned cross-over positions, until a desired number of foils and rods have been positioned, said rods serving to establish and being of a size sufficient to substantially fully define said undulating cross-sections of said foils;
   (D) bonding each of said foils to each next adjacent of said foils at their points of contact to form said expanded unitary structure by applying force to compress said foils together at said cross-over positions and subjecting the compressed foils to bonding conditions to bond said foils together at said cross-over positions; and
   (E) removing each of said pluralities of rods longitudinally from said expanded unitary structure;

further including, following step (C) and preceeding step (D):
   positioning a non-undulating foil next to a lastmost of said undulating foils; and
   using a modified rod as the last of said first plurality of parallel rods, said modified rod having a plurality of nubs contacting said lastmost of said undulating foils, said nubs being positioned substantially in alignment with said cross-over positions.

2. A method as set forth in claim 1, wherein said bonding conditions comprise diffusion bonding conditions.

3. A method of forming a unitary structure having a plurality of deformable foils each having an undulating cross-section, said foils having first and second sides and being stacked one upon another with said first sides facing in one direction and said second sides facing in an opposite direction, adjacent of said foils having their undulations at a non-zero angle to one another, comprising:
   (A) positioning a first comb comprising a first plurality of parallel rods which are held together by a first spine with said first plurality of parallel rods against said first side of a respective one of said foils;
   (B) positioning a second comb comprising a second plurality of parallel rods which are held together by a second spine with said second plurality of parallel rods against said second side of said respective one of said foils with the rods of said second plurality of rods between and parallel to the rods of said first plurality of rods.
   (C) thereafter repeating steps (A) and (B) with each next adjacent foil with the rods positioned against said each next adjacent foil at a non-zero angle to the rods positioned against each preceeding one of said foils until a desired number of foils and rods have been positioned, said rods serving to establish said undulating cross-sections of said foils;
   (D) bonding each of said foils to each next adjacent of said foils at their points of contact by compressing said foils togehter at their points of contact and subjecting the compressed foils to diffusion bonding conditions while at the same time alleviating bending of said combs and thereby maintaining said rods in their desired alignment to form said unitary structure; and
   (E) removing each of said pluralities of rods longitudinally from said unitary structure by pulling each of said combs therefrom;
   said alleviating of bending being accomplished by including a plurality of slots or notches in said comb spines, at least one of said slots or notches being located intermediate each adjacent pair of said rods.

* * * * *